June 3, 1924.
C. F. L. KAUFMANN
SPRINKLER
Filed May 15, 1923
1,496,645
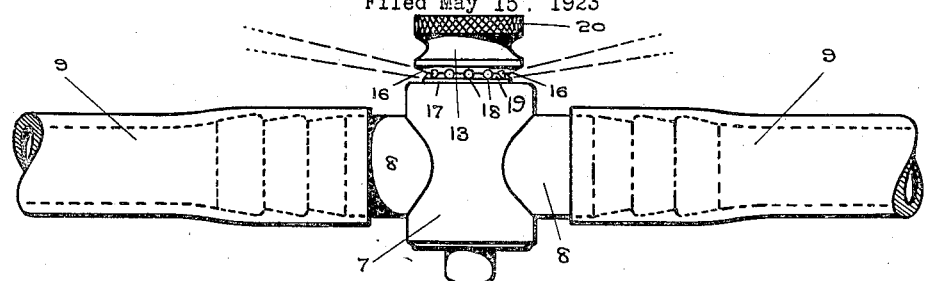
FIG. 1.
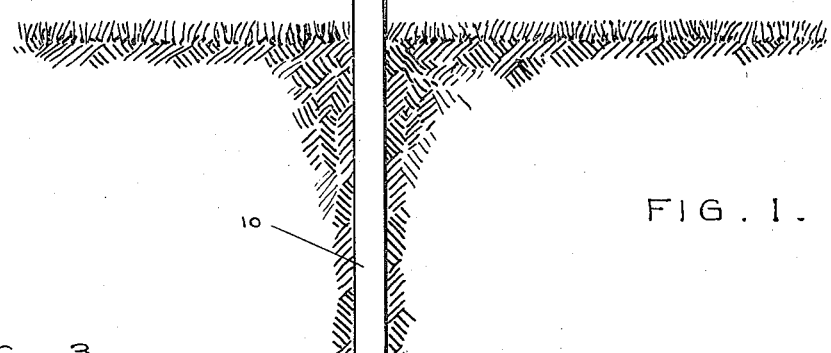
FIG. 3.
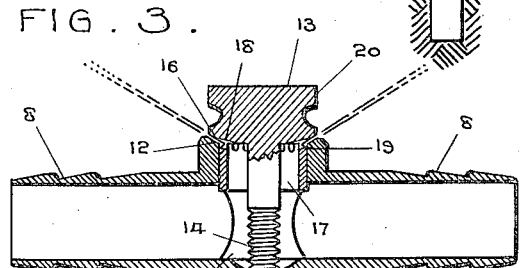
FIG. 2.
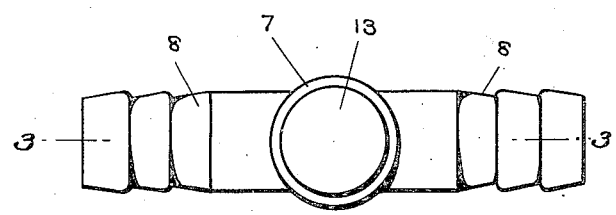
C.F.L.KAUFMANN, Patented June 3, 1924.

1,496,645

UNITED STATES PATENT OFFICE.

CHARLES F. L. KAUFMANN, OF SANTA ANA, CALIFORNIA.

SPRINKLER.

Application filed May 15, 1923. Serial No. 639,139.

*To all whom it may concern:*

Be it known that I, CHARLES F. L. KAUFMANN, a citizen of the United States, residing at Santa Ana, in the county of Orange and State of California, have invented certain new and useful Improvements in Sprinklers, of which the following is a specification, reference being had therein to the accompanying drawing.

The present invention relates to lawn and garden sprinklers, and aims to provide a novel and improved sprinkler which can be disposed in a water conduit, and which has means for fastening it to the ground.

Another object is the provision of a sprinkler having novel and improved means for the discharge of the water in all directions from the vertical axis of the device, and for controlling the spray in an efficient and desirable manner, so that the discharge of the water can be reduced from streams of maximum volume down to a thin film or spray, and also enabling the discharge of water to be shut off.

A further object is the provision of a water discharge member adjustably mounted in the body of the sprinkler and having water discharging apertures, and said member and body having portions cooperable for reducing or shutting off the discharge of the water, in order that the discharge of water can be regulated nicely.

It is also an object of the invention to provide such a device which is simple and inexpensive in construction, which can be readily manufactured, and which will be practical and efficient in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation of the sprinkler showing the water discharge member adjusted for the maximum discharge of water.

Fig. 2 is a plan view of the device.

Fig. 3 is a vertical section on the line 3—3 of Fig. 2 showing the water controlling member adjusted to reduce the discharge of the water to a thin film or spray.

The sprinkler comprises a body 7 of suitable size and shape having the nipples 8 extending horizontally therefrom in opposite directions for the engagement of the adjacent ends of the hose sections 9 of a water supply conduit that extends over the ground, and the sprinklers can thus be readily interposed between the sections of the conduit at desired spaced intervals.

The body 7 has a stem or pin 10 extending downwardly therefrom to be forced into the ground, whereby to secure the sprinkler in place and maintain it in upright position.

The body 7 has a vertical cylindrical chamber 11 opening at the upper end of the body, and the rim or upper end of the body has a bevelled surface 12 surrounding the mouth of the body.

The water-discharge controlling member comprises a head 13 above the upper end of the body 7 and provided with a downwardly-extending stem or shank 14 located centrally within the chamber 11 and screw-threaded down into a threaded socket 15 formed in the bottom of the body 7, whereby the head 13 can be adjusted vertically by screwing it downwardly or upwardly. The head 13 has a downwardly-facing conical shoulder or bevel 16 overhanging and substantially parallel with the bevel 12, so that the head 13 forms a valve to shut off the discharge of water when the shoulder or bevel 16 seats on the bevel 12.

The head 13 has a depending annular skirt 17 fitting snugly in the upper portion of the chamber 11. Said skirt or portion 17 has water discharge apertures 18 extending through the extreme upper portion thereof and terminating at their outer ends in the bevel or shoulder 16, and said apertures radiate from the axis of the body 7 and water controlling member, and are inclined slightly, although the inclination of the apertures 18 is preferably slightly less than the inclination of the bevels 12 and 16. The skirt 17 has a reverse bevel 19 immediately under the bevel or shoulder 16, which forms with the bevel 16 an annular groove at the outer ends of the apertures 18.

The head 13 preferably has a knurled portion 20 for conveniently rotating the head or water-discharge controlling member by hand.

When the head 20 is unscrewed to bring the apertures 18 completely above the bevel 12, as seen in Fig. 1, the water discharges through the apertures 18 in streams radiating in all directions from the vertical axis of the sprinkler, and the maximum discharge of water is thus established. The streams will also be thrown or projected to a considerable distance from the sprinkler, so as to cover a large area. When the head 13 is screwed down, so that the lower portions of the apertures 18 are closed more or less by the rim of the body, the discharge of water is diminished accordingly, and when the bevels 12 and 16 are disposed close together, the streams of water are thinned down and merged together into an annular film or spray. The bevels 12 and 16 being inclined more than the apertures 18 will direct such film or spray upwardly at a greater angle, as seen in Fig. 3, and the discharge of water can be completely shut off by screwing the head 13 down tight on the bevel 12. The more the discharge of water is diminished, the less will be the distance to which the water is thrown from the sprinkler, the sprayed area being reduced in diameter as the amount of water discharged is reduced. Accordingly, the discharge and spraying of the water can be controlled nicely by simply turning the controlling member or head 12. When the head 13 is screwed down, the apertures 18 are moved down into the body 7, to be closed partially or completely by the body, and said apertures are gradually opened as the head 13 is unscrewed from the body. When the head 13 is screwed down with the shoulder or bevel 16 close to the bevel 12 of the body, as seen in Fig. 3, the groove or bevel 19 will enable the water flowing from the apertures, to flow along the groove, so that the streams unite when passing between the bevels 12 and 16, such groove establishing communication between the outer ends of the apertures when the apertures are disposed partially within the body. The space between the bevels 12 and 16 opens directly into the atmosphere, without obstruction, so that the water can be discharged in an inverted cone shape, said bevels being unobstructed at their outer edges, which is essential to the proper discharge of the water.

The device consists of but two parts, so as to be extremely simple and inexpensive, and not apt to get out of order. A sprinkling system for a lawn or garden can be quickly installed, by simply placing the sprinklers at suitable spaced intervals, and connecting them by the hose or conduit sections, thus eliminating the trouble and expense of an unground system.

The sprinkler can also be used at the end of a hose or conduit, in which event one of the nipples 8 is stopped up or otherwise closed, or one nipple can be omitted from the sprinkler.

Having thus described the invention, what is claimed as new is:—

1. A sprinkler comprising a body having a chamber and a bevel surrounding said chamber at the mouth thereof, and a discharge controlling member including a head and a skirt projecting from the head and fitted in said chamber, said member being adjustably connected with the body for inward and outward adjustment, said head having a bevelled shoulder cooperable with said bevel, the space between said bevel and shoulder opening directly into the atmosphere without obstruction, said skirt having an annular set of discharge apertures immediately adjacent to said head, said apertures terminating at their outer ends in said shoulder, and said member being movable outwardly to remove the apertures from within the body so that the fluid discharging from the apertures will not strike said bevel.

2. A sprinkler comprising a body having a chamber and a bevel surrounding said chamber at the mouth thereof, and a discharge controlling member including a head and a skirt projecting from the head and fitted in said chamber, said chamber being adjustably connected with the body for inward and outward adjustment, said head having a bevelled shoulder cooperable with said bevel, said skirt having an annular set of discharge apertures immediately adjacent to said head, said apertures terminating at their outer ends in said shoulder, said member being movable outwardly to remove the apertures from within the body so that the fluid discharging from the apertures will not strike said bevel, said skirt having an annular groove adjacent to said shoulder and intersecting the outer ends of said apertures.

3. A sprinkler comprising a body having a chamber, and a discharge controlling member including a head, a stem extending from the head and screw-threaded in the body at that end of the chamber opposite to the discharge end thereof, and a skirt projecting from the head and fitted in said chamber, said skirt being spaced from and surrounding the stem and having discharge apertures to be moved out of and into the body.

4. A sprinkler comprising a body having a chamber and a bevel surrounding said chamber, and a discharge controlling member including a head, a stem extending from the head and screw-threaded in the body at that end of said chamber opposite to the bevel, and a skirt projecting from the head and fitted in said chamber said skirt being spaced from and surrounding said stem, said head having a bevelled shoulder cooperable with the aforesaid bevel to reduce the discharge, and said skirt having discharge apertures terminating at their outer ends in said shoulder.

In testimony whereof I hereunto affix my signature.

CHARLES F. L. KAUFMANN.